United States Patent
Iwamiya

(10) Patent No.: US 10,863,568 B2
(45) Date of Patent: Dec. 8, 2020

(54) WIRELESS COMMUNICATION DEVICE, ELECTRONIC TIMEPIECE, WIRELESS COMMUNICATION METHOD, AND RECORDING MEDIUM

(71) Applicant: CASIO COMPUTER CO., LTD., Tokyo (JP)

(72) Inventor: Hiroshi Iwamiya, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/139,280

(22) Filed: Sep. 24, 2018

(65) Prior Publication Data

US 2019/0098685 A1    Mar. 28, 2019

(30) Foreign Application Priority Data

Sep. 26, 2017 (JP) ................................ 2017-184646

(51) Int. Cl.
*H04W 76/19* (2018.01)
*H04L 9/32* (2006.01)
*H04W 76/18* (2018.01)

(52) U.S. Cl.
CPC .............. *H04W 76/19* (2018.02); *H04L 9/32* (2013.01); *H04W 76/18* (2018.02); *H04L 2209/80* (2013.01)

(58) Field of Classification Search
None
See application file for complete search history.

(56) References Cited

U.S. PATENT DOCUMENTS

| | | | |
|---|---|---|---|
| 2013/0215735 A1* | 8/2013 | Yasumoto | H04W 24/04 370/216 |
| 2015/0222517 A1* | 8/2015 | McLaughlin | H04L 63/0435 713/156 |
| 2016/0128117 A1* | 5/2016 | Engelien-Lopes | H04W 76/14 455/41.2 |
| 2016/0278006 A1 | 9/2016 | Lee et al. | |

FOREIGN PATENT DOCUMENTS

| | | |
|---|---|---|
| JP | 2008-042476 A | 2/2008 |
| JP | 2016-163092 A | 9/2016 |
| JP | 2017-034562 A | 2/2017 |
| JP | 2017-169119 A | 9/2017 |

OTHER PUBLICATIONS

Extended European Search Report dated Feb. 14, 2019 in European Patent Application No. 18 19 6180.6.
Office Action dated Mar. 13, 2020 received in European Patent Application No. EP 18 196 180.6.

* cited by examiner

*Primary Examiner* — Joseph A Bednash
(74) *Attorney, Agent, or Firm* — Scully Scott Murphy & Presser

(57) ABSTRACT

A wireless communication device includes a wireless communicator and a processor. The wireless communicator wirelessly communicates with another wireless communication device. The processor controls the wireless communicator to broadcast connection information when reconnection to the other wireless communication device or wireless communication after reconnection with the other wireless communication device fails after termination of a connection with the other wireless communication device. The connection information is information related to the connection.

10 Claims, 8 Drawing Sheets

WIRELESS COMMUNICATION DEVICE, ELECTRONIC TIMEPIECE, WIRELESS COMMUNICATION METHOD, AND RECORDING MEDIUM

CROSS-REFERENCE TO RELATED APPLICATION

This application claims the benefit of Japanese Patent Application No. 2017-184646, filed on Sep. 26, 2017, the entire disclosure of which is incorporated by reference herein.

FIELD

This application relates generally to a wireless communication device, an electronic timepiece, a wireless communication method, and a recording medium.

BACKGROUND

In the related art, there is a technique for recovering from communication connection failures that occur between communication devices by pseudo-resetting the output and re-performing the authentication processing (for example, see Unexamined Japanese Patent Application Kokai Publication No. 2016-163092).

However, in many cases, in addition to recovering from the connection failure as described in Unexamined Japanese Patent Application Kokai Publication No. 2016-163092, there is a desire to elucidate the cause of the connection failure. For example, there is a demand for a connection log to be collected to enable understanding of the cause of failure for cases in which the reconnection or wireless communication after reconnection of wireless communication devices, which previously had been connected to each other, fails.

SUMMARY

To achieve the objective described above, a wireless communication device according to one aspect of the present disclosure includes a wireless communicator and a processor. The wireless communicator communicates with another wireless communication device. The processor, when reconnection to the other wireless communication device or wireless communication after reconnection with the other wireless communication device fails after termination of a connection to the other wireless communication device, controls the wireless communicator to broadcast connection information related to the connection.

BRIEF DESCRIPTION OF THE DRAWINGS

A more complete understanding of this application can be obtained when the following detailed description is considered in conjunction with the following drawings, in which.

DETAILED DESCRIPTION

Hereinafter, embodiments are described while referencing the drawings.

Figure 1:
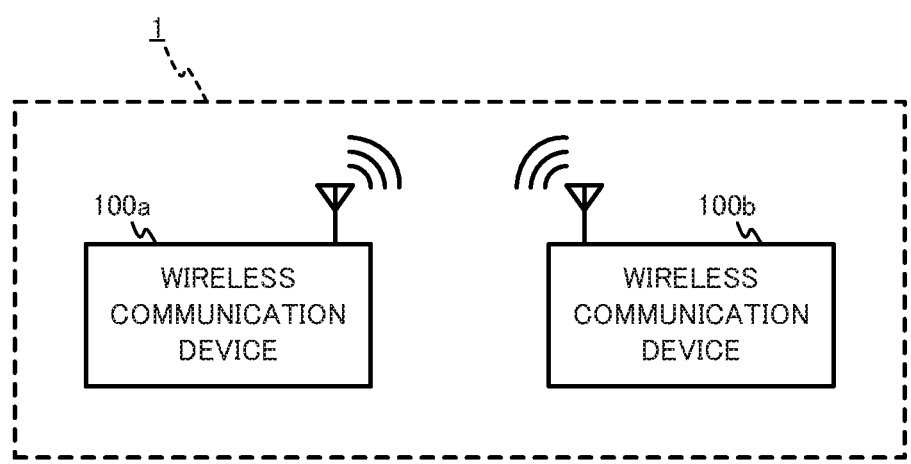
FIG. 1 is a drawing illustrating a configuration example of a wireless communication system according to an embodiment.

FIG. 1 is a drawing illustrating a configuration example of a wireless communication system 1 according to the present embodiment. In the configuration example illustrated in FIG. 1, the wireless communication system 1 includes wireless communication devices 100a and 100b. The wireless communication devices 100a and 100b (hereinafter generally referred to as "wireless communication device 100") wirelessly communicate with each other on the basis of Bluetooth (registered trademark) Low Energy (hereinafter referred to as "BLE"). In the near-field communication protocol called Bluetooth (registered trademark), BLE is a protocol (mode) designed to achieve low power consumption. In the present embodiment, the wireless communication device 100 operates as a peripheral that sends advertising packets or as a central that receives advertising packets (both described later). The wireless communication device 100 is an electronic device provided with wireless communication functions, such as a smartphone, a mobile phone, a personal computer (PC), a personal digital assistant (PDA), an electronic timepiece, or a smart timepiece.

Next, the configuration of the wireless communication device 100 according to the present embodiment will be described.

Figure 2:
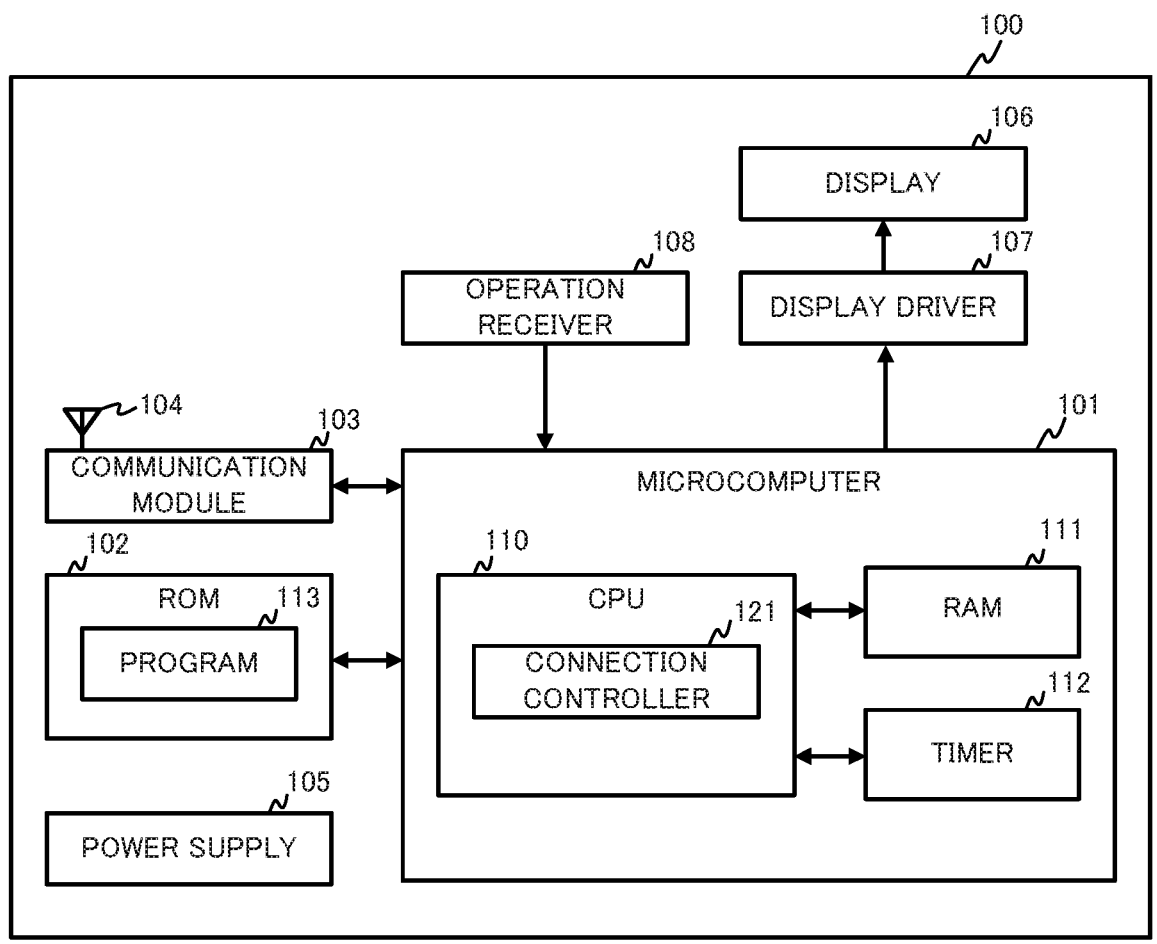
FIG. 2 is a block diagram illustrating a configuration of wireless communication devices according to the embodiment.

First, the hardware configuration of the wireless communication device 100 according to the present embodiment will be described. FIG. 2 is a block diagram illustrating the configuration of the wireless communication device 100 according to the present embodiment. The wireless communication device 100 includes a microcomputer 101, a read-only memory (ROM) 102, a communication module 103, an antenna 104, a power supply 105, a display 106, a display driver 107, and an operation receiver 108.

The microcomputer 101 includes a central processing unit (CPU) 110 as a controller, random access memory (RAM) 111 as a storage unit, a timer 112, and the like. Note that the RAM 111 and the timer 112 are not limited to being provided in the microcomputer 101 and may be provided outside the microcomputer 101. Additionally, the ROM 102, the communication module 103, the antenna 104, the power supply 105, and the display driver 107 are not limited to being provided outside the microcomputer 101 and may be provided in the microcomputer 101.

The CPU 110 is a processor that carries out various types of arithmetic processing and overall control of all operations of the wireless communication device 100. The CPU 110 reads control programs from the ROM 102 and loads the control programs into the RAM 111 to carry out various types of operation processing, such as arithmetic controlling and displaying related to various types of functions. Additionally, the CPU 110 controls the communication module 103 to carry out data communication with the other wireless communication device 100.

The RAM 111 is volatile memory such as static random access memory (SRAM) or dynamic random access memory (DRAM). Temporary data and various types of setting data are stored in the RAM 111.

The timer 112 includes an oscillation circuit, a frequency dividing circuit, a timing circuit, and the like, and clocks the current time.

The ROM 102 is nonvolatile memory or the like. Control programs, initial setting data, and the like are stored in the ROM 102. The control programs include a program 113 related to the control of the various types of processing for controlling the wireless communication with the other wireless communication device 100.

Figure 3:
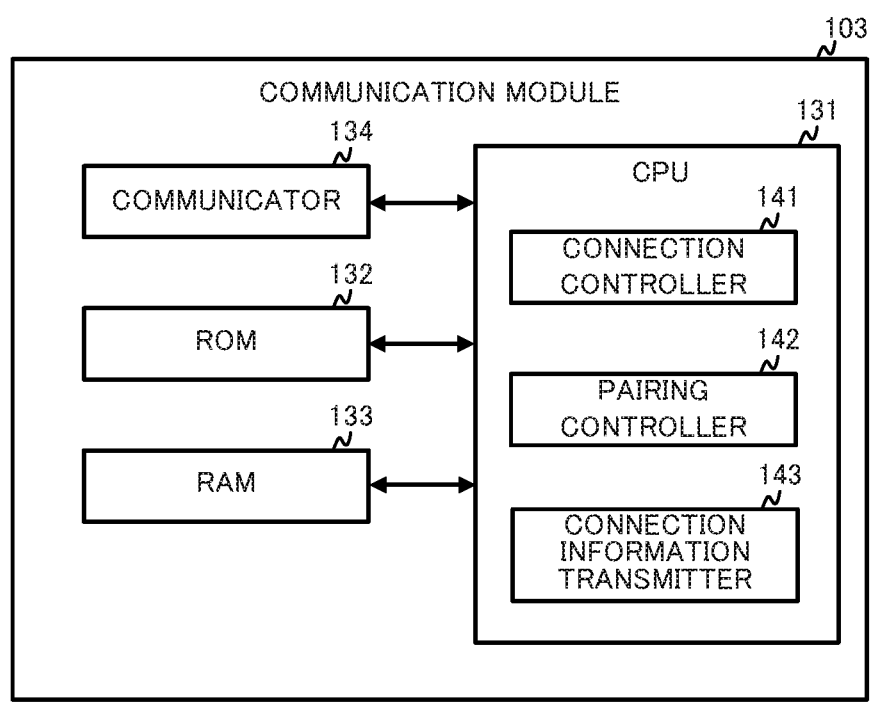
FIG. 3 is a block diagram illustrating a configuration of a communication module according to the embodiment.

The communication module 103 is a Bluetooth (registered trademark) controller that carries out BLE-based sending and receiving of radio signals via the antenna 104. FIG. 3 illustrates the configuration of the communication module 103 according to the present embodiment. As illustrated in FIG. 3, the communication module 103 includes a CPU 131 as a controller, ROM 132, RAM 133, and a communicator 134.

The CPU 131 is a processor that carries out the various types of arithmetic processing and the overall control of all operations of the communication module 103. The CPU 131 reads control programs from the ROM 132 and loads the control programs into the RAM 133 to carry out various types of operation processing related to BLE-based sending and receiving of radio signals. Additionally, the CPU 131 carries out various types of operation processing in accordance with instructions from the CPU 110.

In one example, the communicator 134 includes a radio frequency (RF) circuit and/or a baseband (BB) circuit, and a memory circuit. The communicator 134 demodulates and/or decrypts the radio signals received via the antenna 104, and sends these radio signals to the CPU 131. Moreover, the communicator 134 encrypts and/or modulates signals sent from the CPU 131, and outputs these signals via the antenna 104.

In one example, the power supply 105 includes a battery and a voltage conversion circuit. The power supply 105 supplies power at the operating voltage of the components in the wireless communication device 100. Examples of the battery of the power supply 105 include a primary battery such as a button type dry battery and a secondary battery such as a lithium-ion battery.

In one example, the display 106 includes a display panel such as a liquid crystal display (LCD) or an organic electroluminescent (EL) display. The display driver 107 outputs, to the display 106, a driving signal corresponding to the type of display 106 on the basis of a control signal from the microcomputer 101, and displays various types of information on the display panel. In one example, the display 106 displays the current time clocked by the timer 112.

The operation receiver 108 receives input operations from the user and outputs electronic signals, corresponding to the input operations, to the microcomputer 101. In one example, a configuration is possible in which the operation receiver 108 is provided by laminating a touch sensor on the display panel of the display 106, thereby providing a touch panel with the display panel. In this case, the touch sensor detects a contact position and/or a contact mode related to a contact operation by the user on the touch sensor, and outputs an operation signal corresponding to the detected contact position and/or contact mode to the microcomputer 101.

Next, the functional configuration of the wireless communication device 100 according to the present embodiment will be described. As illustrated in FIG. 2, the CPU 110 functions as a connection controller 121. The functions of the connection controller 121 may be realized by a processor other than that of the microcomputer 101. For example, the functions of the connection controller 121 may be realized by a CPU 131 of the communication module 103 or the like.

The CPU 110 as the connection controller 121 controls the communication module 103 to establish a connection with the other wireless communication device 100. For example, when the wireless communication device 100 operates as the central, the CPU 110 controls the communication module 103 to execute a scan in order to receive an advertising packet from the other wireless communication device 100, which is operating as the peripheral. Additionally, when a notification is received from the communication module 103 indicating that an advertising packet has been received from the other wireless communication device 100, the CPU 110 updates the list (advertiser list) of other wireless communication devices 100, which are sending origins of the received advertising packets. Then, the CPU 110 presents the advertiser list to the user and instructs the communication module 103 to send a connection request to the other wireless communication device 100 selected by the user. Then, the CPU 110 receives a notification (connection establishment notification) from the communication module 103 that sent the connection request, indicating that a connection has been established. Alternatively, when the wireless communication device 100 operates as the peripheral, the CPU 110 controls the communication module 103 to execute the sending of an advertising packet to the other wireless communication device 100. Additionally, the CPU 110 receives the connection request from the other wireless communication device 100 and receives the connection establishment notification.

In one example, after the connection with the other wireless communication device 100 has been established, when the reception of data from the other wireless communication device 100 has ended or an indicator to end communication with the other wireless communication device 100 has been received from the user via the operation receiver 108, the CPU 110 instructs the communication module 103 to send a request to terminate the connection with the other wireless communication device 100. Additionally, when the connection with the other wireless communication device 100 is terminated due to the communication module 103 not receiving packets from the other wireless communication device 100 for a predetermined period of time, the CPU 110 receives a terminate completion notification from the communication module 103 indicating that the connection with the other wireless communication device 100 has been terminated. Then, the CPU 110 sends a connection indicator to the communication module 103 to reconnect to the other wireless communication device 100.

Next, the functional configuration of the CPU 131 of the communication module 103 according to the present embodiment will be described.

As illustrated in FIG. 3, the CPU 131 functions as a connection controller 141, a pairing controller 142, and a connection information transmitter 143. The functions of the connection controller 141, the pairing controller 142, and the connection information transmitter 143 may be realized by a single CPU or may be realized by multiple independent CPUs. Moreover, these functions may be realized by a processor other than the CPU 131. For example, these functions may be realized by the CPU 110 or the like.

The CPU 131 as the connection controller 141 controls the communicator 134 to control the connection with the other wireless communication device 100. Specifically, when functioning as the peripheral and an indicator to start advertising is received from the CPU 110, the CPU 131 controls the communicator 134 to start the sending of the advertising packet. The advertising packet is an example of presence information that indicates presence of the wireless communication device 100 to the other wireless communication device 100. The advertising packet includes the address of the device that sent the advertising packet. Additionally, the CPU 131 controls the communicator 134 to receive a connection request, requesting a connection with the wireless communication device 100, from the other wireless communication device 100 that received the advertising packet. The connection request includes the address of the other wireless communication device 100 and parameters for administrating communication with the other wireless communication device 100 after a connection between the wireless communication device 100 and the other wireless communication device 100 has been established. When the communicator 134 receives the connection request, the CPU 131 sends a connection completion notification to the CPU 110. Alternatively, when operating as the central, the CPU 131 controls the communication module 134 to start a scan in order to receive the advertising packet from the other wireless communication device 100, which is operating as the peripheral. Then, when the advertising packet is received by the communicator 134, the CPU 131 controls the communicator 134 to send a connection request to the sending origin of the advertising packet, namely, the other wireless communication device 100. When the communicator 134 sends the connection request, a connection completion notification is sent to the CPU 110.

The CPU 110 as the pairing controller 142 controls the pairing with the other wireless communication device 100 after the connection with the other wireless communication device 100 has been established. Here, "paring" refers to the wireless communication device 100 exchanging, with the other wireless communication device 100, device information identifying themselves and encryption information encrypting the wireless communication with the other wireless communication device 100.

In the present embodiment, the CPU 131 exchanges device information with the other wireless communication device 100 via a link layer. Specifically, the CPU 131 exchanges device information (LL_VERSION_IND) with the other wireless communication device 100 immediately after connecting to the other wireless communication device 100. The device information (LL_VERSION_IND) includes the version number of the Bluetooth (registered trademark) controller, a manufacturer identification number, and an implementation number. The CPU 131 sends its own device information, which is stored in advance in the ROM 132, to the other wireless communication device 100 and also receives and stores the device information of the other wireless communication device 100 in the ROM 132.

In the present embodiment, the CPU 131 exchanges encryption information in communication with the other wireless communication device 100 following security management protocol (SMP). Specifically, the CPU 131 exchanges, as the encryption information, a decryption key such as a long-term key (LTK) with the other wireless communication device 100. The CPU 131 generates encryption information when pairing with the other wireless communication device 100, sends the encryption information to the other wireless communication device 100, receives encryption information from the other wireless communication device 100, and stores this encryption information together with the device information of the other wireless communication device 100 in the ROM 132. Then, the CPU 131 controls the communicator 134 to carry out encrypted communication with the other wireless communication device 100, using the encryption information.

In the present embodiment, after terminating the connection with the other wireless communication device 100, the CPU 131 determines whether reconnection with the other wireless communication device 100 was successful on the basis of the device information and the encryption information that was exchanged. Specifically, when any of the following first to third conditions are satisfied, the CPU 131 determines that reconnection or wireless communication after reconnection has failed.

Condition 1: The CPU 131 determines that reconnection with the other wireless communication device 100 has failed in cases in which the wireless communication device 100 functions as the peripheral and, after the connection with the other wireless communication device 100 is terminated, sends an advertising packet but does not receive a connection request from the other wireless communication device 100 in response to that advertising packet. For example, the CPU 110 of the other wireless communication device 100 does not send an indicator to connect with the peripheral in cases in which the other wireless communication device 100 operating as the central has lost the device information and the encryption information of the peripheral. In such a case, the CPU 131 of the other wireless communication device 100 does not send a connection request to the peripheral. Therefore, the wireless communication device 100 operating as the peripheral does not receive a connection request from the other wireless communication device 100 in response to the advertising packet, and the CPU 131 determines that reconnection with the other wireless communication device 100 has failed.

Condition 2: The CPU 131 determines that wireless communication after reconnection with the other wireless communication device 100 has failed in cases in which, after connection termination and subsequent reconnection with the other wireless communication device 100, an exchange request requesting the exchange of encryption information is received from the other wireless communication device 100. For example, the other wireless communication device 100 sends an encryption information request requesting the sending of the encryption information after reconnecting with the peripheral in cases in which the other wireless communication device 100 operating as the central has lost the encryption information of the peripheral. Meanwhile, the CPU 131 of the wireless communication device 100, which is the peripheral, already has the encryption information of the other wireless communication device 100 and, as such, is awaiting the encryption request and does not send the encryption information response expected by the central. Therefore, the CPU 131 terminates the connection with the other wireless communication device 100 due to a timeout (SMP_TimeOUT), and determines that the wireless communication after reconnection with the other wireless communication device 100 has failed.

Condition 3: The CPU 131 determines that wireless communication after reconnection with the other wireless communication device 100 has failed in cases in which, after connection termination and subsequent reconnection with the other wireless communication device 100, an encryption request requesting the encryption of wireless communication with the other wireless communication device 100 is received and the wireless communication device 100 does not have the encryption information of the other wireless communication device 100. For example, in a case in which the wireless communication device 100 operating as the peripheral does not have the encryption information of the other wireless communication device 100 operating as the central, that is, in a case in which the wireless communication device 100 is not paired with the other wireless communication device 100, the wireless communication device 100 is awaiting the reception of the encryption information request from the other wireless communication device 100 after reconnecting to the other wireless communication device 100. However, since the other wireless communication device 100 sends an encryption request using the encryption information of the peripheral that is already held by the other wireless communication device 100, the CPU terminates the connection with the other wireless communication device 100 due to a timeout (LL_TimeOUT), and determines that the wireless communication after reconnection with the other wireless communication device 100 has failed.

The CPU 131 as the connection information transmitter 143 broadcasts the connection information related to the connection when reconnection or wireless communication after reconnection with the other wireless communication device 100 fails.

In the present embodiment, the connection information is information related to the connection with the other wireless communication device 100. In one example, of the data included in the advertising packet, the connection information is included in transmittable data in a manufacturer specific data format recorded in a Bluetooth (registered trademark) special interest group (SIG). Hereinafter, an example is described of a data format in which the connection information is included in manufacturer specific data.

(a) Timestamp

Data expressing the date and time of the timing at which a reconnection failure event with the wireless communication device 100 occurred.

(b) CheckData

Data indicating that the following data is log data from when reconnection failed.

(c) Own_DeviceName

Data expressing the device name of a given device.

(d) BondedDev_Name

Data expressing the device name of the other wireless communication device 100 acquired when pairing.

(e) ConnectedDevice_Matching

Data expressing whether the device information of the paired wireless communication device 100 registered in itself matches the device information of the reconnected wireless communication device 100.

(f) Device_VerInformation

Data expressing the device information of the paired wireless communication device 100.

(g) Pairing_ENC_ReqReceived

Data expressing whether an exchange request (SMP_Pairing_REQ) requesting the exchange of the encryption information has been received or the encryption request (LL_ENC_REQ) has been received from the wireless communication device 100 attempting to reconnect.

In the present embodiment, the CPU 131 of the wireless communication device 100 operating as the peripheral broadcasts an advertising packet that includes the log data of (a) to (g) described above as the connection information. Note that the data included in the advertising packet as the connection information is not limited to the data of (a) to (g) described above, and configurations are possible in which the data of a portion of (a) to (g) or other data is included in the advertising packet as the connection information.

In the present embodiment, the CPU 131 of the wireless communication device 100 operating as the peripheral sends the type of the advertising packet to a large unspecified number of wireless communication devices 100 to broadcast the connection information, and also sets a type (ADV_NONCONN_IND) that indicates non-acceptance of connection requests. Then, the CPU 131 controls the communicator 134 to send the advertising packet including the connection information. The CPU 131 of the wireless communication device 100 operating as the central receives the advertising packet including the connection information.

Figure 4:
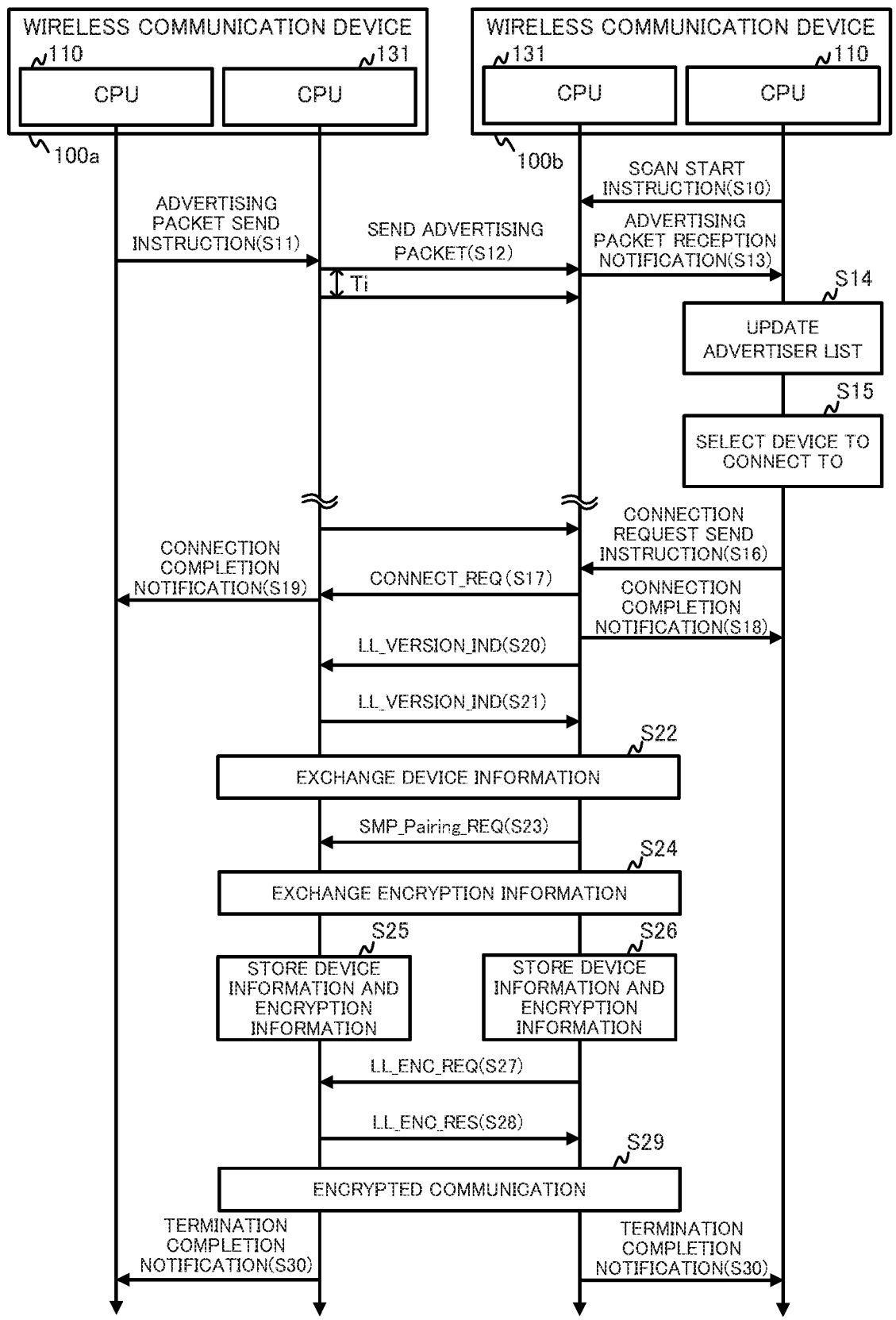
FIG. 4 is a sequence diagram illustrating the operations of the wireless communication system when the wireless communication devices establish a connection for the first time.

Next, the operations of the wireless communication system 1 according to the present embodiment will be described. FIG. 4 is a sequence diagram illustrating an example of the connection operations of the wireless communication system 1 according to the present embodiment. In the example illustrated in FIG. 4, the operations of the CPUs 110 and the CPUs 131 of the communication modules 103 of the wireless communication devices 100*a* and 100*b* are described for a case in which the wireless communication device 100*a* operates as the peripheral and the wireless communication device 100*b* operates as the central. Note that FIG. 4 depicts an example of a case in which the wireless communication devices 100*a* and 100*b* establish a connection for the first time. In one example, the wireless communication devices 100*a* and 100*b* start wireless communication operations for executing data communication at a regular time once per day.

The CPU 110 of the wireless communication device 100*b* instructs the CPU 131 of the communication module 103 to start a scan to enable the reception of the advertising packet from the wireless communication device 100*a* (step S10).

Additionally, the CPU 110 of the wireless communication device 100*a* instructs the CPU 131 of the communication module 103 to send the advertising packet (step S11). Thereafter, the CPU 131 sends the advertising packet each time interval Ti (step S12).

When the advertising packet is received from the wireless communication device 100*a*, the CPU 131 of the wireless communication device 100*b* issues a notification to the CPU 110 indicating the reception (step S13). When the reception notification of the advertising packet is received, the CPU 110 updates the advertiser list (step S14). Then, the CPU 110 receives a selection of a device, on the advertiser list, to be connected to from the user (step S15). Next, the CPU 110 instructs the CPU 131 of the communication module 103 to send the connection request (CONNECT_REQ) to the wireless communication device 100*a* as the selected device (step S16). Then, the CPU 131 sends the connection request (CONNECT_REQ) to the wireless communication device 100*a* (step S17). Additionally, the CPU 131 sends a connection completion notification to the CPU 110 (step S18).

When the connection request (CONNECT_REQ) is received, the CPU 131 of the wireless communication device 100*a* sends a connection completion notification to the CPU 110 (step S19). Thus, the wireless communication devices 100*a* and 100*b* establish a connection.

Then, the CPU 131 of the wireless communication device 100b sends its own device information (LL_VERSION_IND) to the wireless communication device 100a (step S20). Additionally, the CPU 131 of the wireless communication device 100a sends its own device information (LL_VERSION_IND) to the wireless communication device 100b (step S21). Then, the wireless communication device 100a and the wireless communication device 100b exchange device information (step S22).

Then, the CPU 131 of the wireless communication device 100b sends an encryption information (SMP_Pairing_REQ) to the wireless communication device 100a (step S23). Then, the wireless communication device 100a and the wireless communication device 100b exchange encryption information via SMP (step S24). The CPUs 131 of the wireless communication device 100a and the wireless communication device 100b store the device information and the encryption information that was exchanged (step S26).

Thereafter, the CPU 131 of the wireless communication device 100b sends an encryption request (LL_ENC_REQ) to the wireless communication device 100a (step S27). Additionally, when the encryption request (LL_ENC_REQ) is received, the CPU 131 of the wireless communication device 100a sends an encryption response (LL_ENC_RES) to the wireless communication device 100b (step S28). Then, the wireless communication devices 100a and 100b carry out encrypted communication using the encryption information that was exchanged (step S29).

Thereafter, when, due to reasons such as the wireless communication devices 100a and 100b being separated by a distance from each other, packets cannot be received for a predetermined period of time, the CPUs 131 of the wireless communication devices 100a and 100b send termination completion notifications to the CPUs 110 (step S30). Thus, the wireless communication device 100a terminates the communication connection with the wireless communication device 100b.

Figure 5:
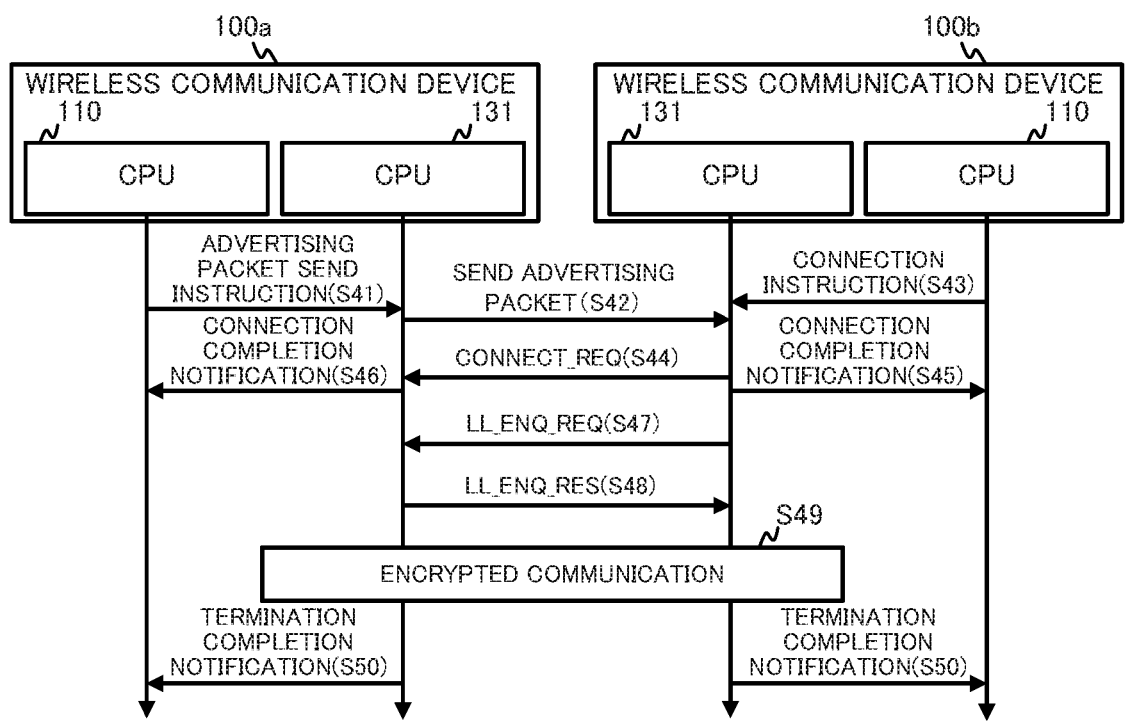
FIG. 5 is a sequence diagram illustrating the operations of the wireless communication system when the wireless communication devices successfully reconnect and wirelessly communicate thereafter.

FIG. 5 is a sequence diagram illustrating an example of the reconnection operations of the wireless communication system 1 according to the present embodiment. As illustrated in FIG. 4, FIG. 5 illustrates an example of a case in which the connection between the wireless communication devices 100a and 100b is terminated and, thereafter, the wireless communication devices 100a and 100b are reconnected and encrypted communication is successful.

The CPU 110 of the wireless communication device 100a instructs the CPU 131 of the communication module 103 to send the advertising packet (step S41). Thereafter, as in step S12 of FIG. 4, the CPU 131 sends the advertising packet each time interval Ti (step S42).

The CPU 110 of the wireless communication device 100b instructs the CPU 131 of the communication module 103 to send the connection request to the wireless communication device 100a upon reception of the advertising packet from the wireless communication device 100a (step S43). Then, when the advertising packet is received from the wireless communication device 100a, the CPU 131 sends a connection request (CONNECT_REQ) to the wireless communication device 100a (step S44). Additionally, the CPU 131 sends a connection completion notification to the CPU 110 (step S45).

When the connection request (CONNECT_REQ) is received, the CPU 131 of the wireless communication device 100a sends a connection completion notification to the CPU 110 (step S46). Thus, the wireless communication devices 100a and 100b are reconnected.

Then, the CPU 131 of the wireless communication device 100b sends an encryption request (LL_ENC_REQ) to the wireless communication device 100a (step S47). When the encryption request (LL_ENC_REQ) is received, the CPU 131 of the wireless communication device 100a sends an encryption response (LL_ENC_RES) to the wireless communication device 100b (step S48). Then, the wireless communication devices 100a and 100b carry out encrypted communication using the exchanged encryption information stored in steps S25 and S26 of FIG. 4 (step S49). Thereafter, when the encrypted communication ends, the CPUs 131 of the wireless communication devices 100a and 100b send termination completion notifications to the CPUs 110 (step S50). Thus, the wireless communication device 100a terminates the communication connection with the wireless communication device 100b.

Figure 6:
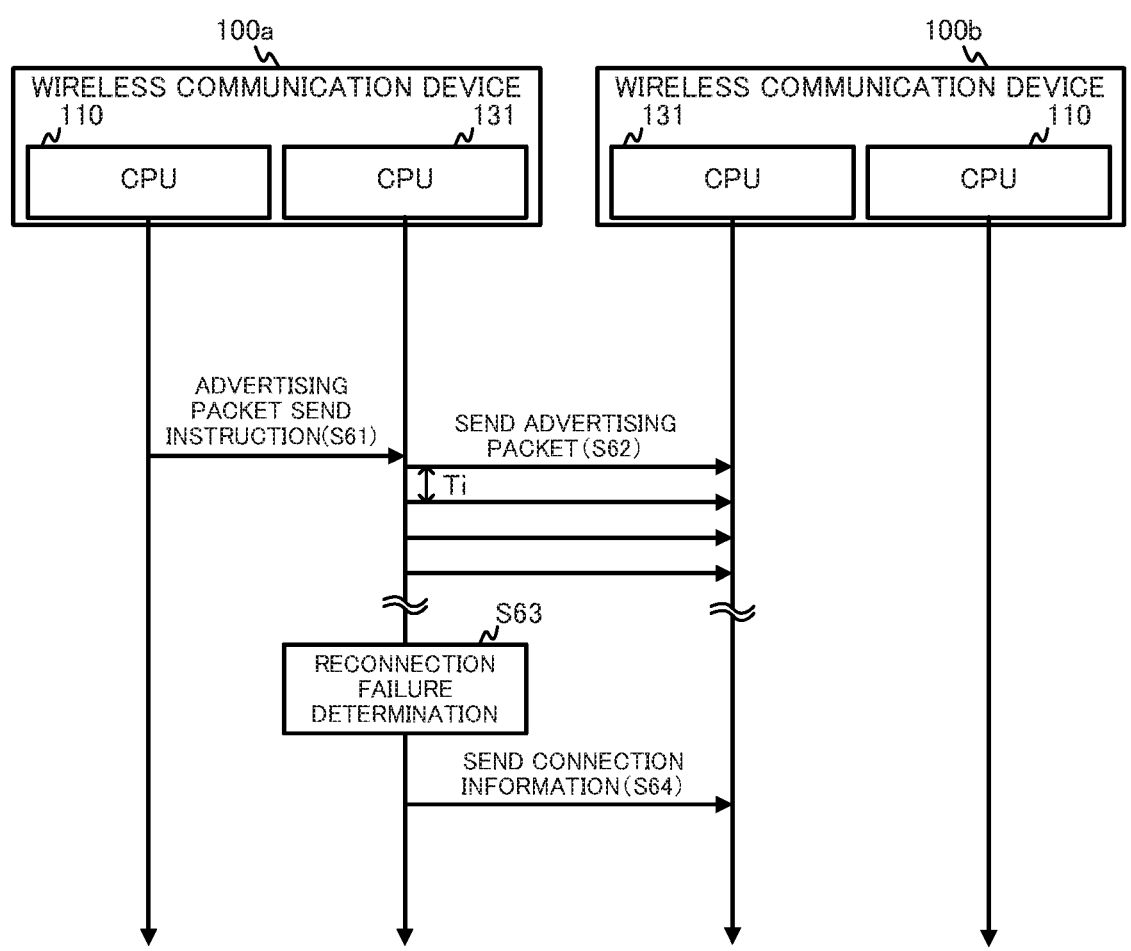
FIG. 6 is a sequence diagram illustrating the operations of the wireless communication system when the wireless communication devices fail to reconnect.

FIG. 6 is a sequence diagram illustrating an example of the reconnection operations of the wireless communication system 1 according to the present embodiment. As illustrated in FIG. 4, FIG. 6 illustrates an example of a case in which the connection between the wireless communication devices 100a and 100b is terminated and, thereafter, the wireless communication devices 100a and 100b do not satisfy Condition 1 described above and reconnection fails.

The CPU 110 of the wireless communication device 100a instructs the CPU 131 of the communication module 103 to send the advertising packet (step S61). Thereafter, as in step S12 illustrated in FIG. 4, the CPU 131 sends the advertising packet each time interval Ti (step S62).

Since the CPU 131 of the wireless communication device 100b has lost the device information and the encryption information of the wireless communication device 100a, the CPU 110 of the wireless communication device 100b does not send an indicator to the communication module 103 to connect with the wireless communication device 100a. As such, the CPU 131 of the wireless communication device 100b does not send a connection request to the wireless communication device 100a. Therefore, when it is determined that the connection request has not been received in the predetermined period of time from the wireless communication device 100b in response to the advertising packet, the CPU 131 of the wireless communication device 100a determines that reconnection with the wireless communication device 100b has failed (step S63).

Then, the CPU 131 of the wireless communication device 100a sends, for a certain period of time, an advertising packet including the connection information related to the connection with the wireless communication device 100b (step S64). The CPU 131 of the wireless communication device 100b receives the advertising packet including the connection information.

Figure 7:
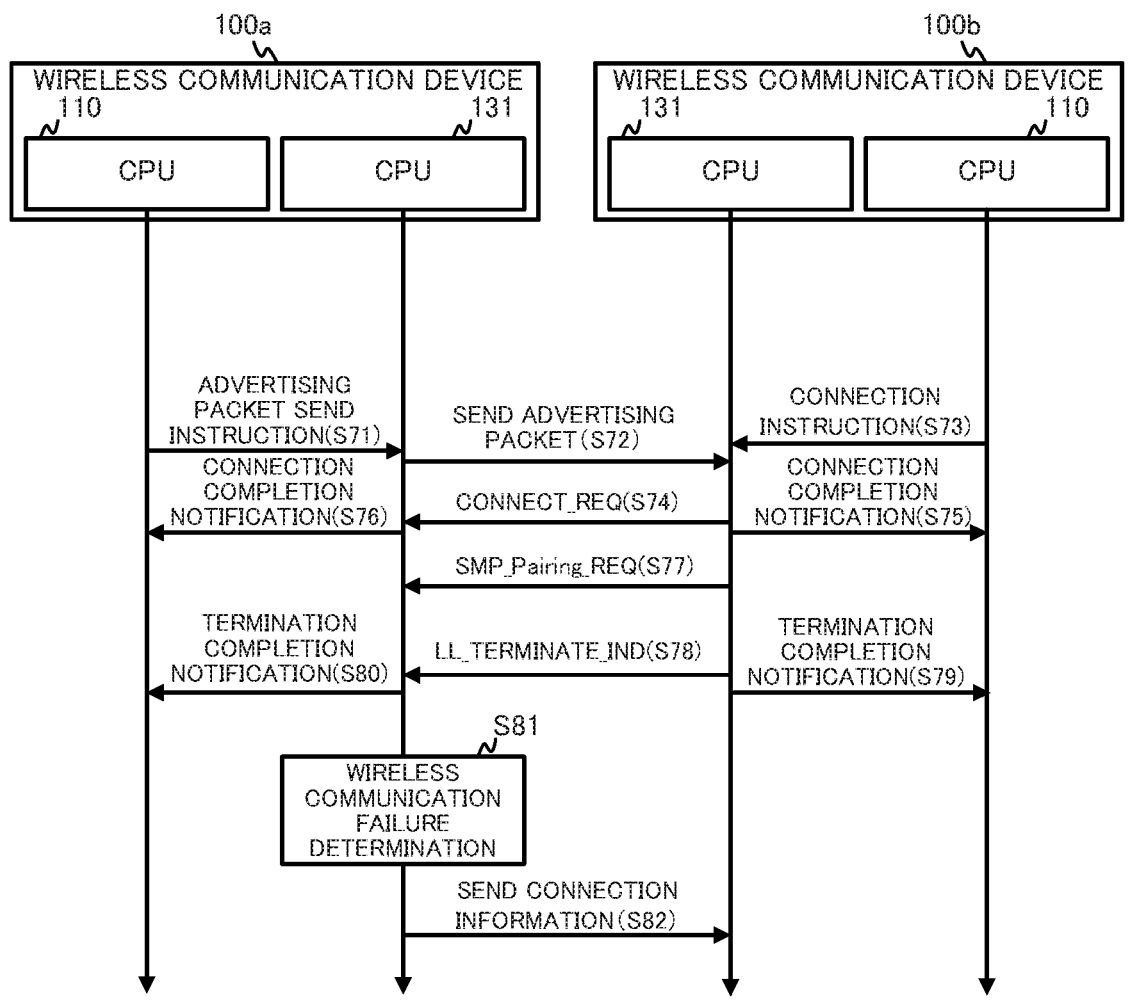
FIG. 7 is a sequence diagram illustrating the operations of the wireless communication system when the wireless communication devices fail to wirelessly communicate after reconnection.

FIG. 7 is a sequence diagram illustrating an example of the reconnection operations of the wireless communication system 1 according to the present embodiment. As illustrated in FIG. 4, FIG. 7 illustrates an example of a case in which the connection between the wireless communication devices 100a and 100b is terminated and, thereafter, the wireless communication devices 100a and 100b do not satisfy Condition 2 described above and wireless communication after reconnection fails.

The CPU 110 of the wireless communication device 100a instructs the CPU 131 of the communication module 103 to send the advertising packet (step S71). Thereafter, as in step S12 illustrated in FIG. 4, the CPU 131 sends the advertising packet each time interval (step S72).

The CPU 110 of the wireless communication device 100b instructs the CPU 131 of the communication module 103 to send a connection request to the wireless communication device 100*a* upon reception of the advertising packet from the wireless communication device 100*a* (step S73). Then, when the advertising packet is received from the wireless communication device 100*a*, the CPU 131 sends the connection request (CONNECT_REQ) to the wireless communication device 100*a* (step S74). Additionally, the CPU 131 sends a connection completion notification to the CPU 110 (step S75).

When the connection request (CONNECT_REQ) is received, the CPU 131 of the wireless communication device 100*a* sends a connection completion notification to the CPU 110 (step S76). Thus, the wireless communication devices 100*a* and 100*b* are reconnected.

Then, since the encryption information of the wireless communication device 100*a* stored in step S26 in FIG. 4 has been lost, after reconnection with the wireless communication device 100*a*, the CPU 131 of the wireless communication device 100*b* sends the encryption information request (SMP_Pairing_REQ) requesting the encryption information (step S77). Meanwhile, the CPU 131 of the wireless communication device 100*a* already has the encryption information of the other wireless communication device 100 that was stored in step S25 of FIG. 4 and, as such, is awaiting the encryption request (LL_ENC_REQ) and does not send the encryption information response (SMP_Pairing_RES), which is expected by the wireless communication device 100*b*. As such, due to the encryption information response (SMP_Pairing_RES) not being received within the predetermined period of time, the CPU 131 of the wireless communication device 100*b* sends an indicator (LL_TERMINATE_IND) to terminate the connection with the wireless communication device 100*a* to the wireless communication device 100*a* (step S78), and sends a termination completion notification to the CPU 110 (step S79). When the connection termination indicator (LL_TERMINATE_IND) is received, the CPU 131 of the wireless communication device 100*a* sends a termination completion notification to the CPU 110 (step S80).

Then, the CPU 131 of the wireless communication device 100*a* determines that the wireless communication after reconnection with the wireless communication device 100*b* has failed (step S81). Then, the CPU 131 sends, for a certain period of time, an advertising packet including the connection information related to the connection with the wireless communication device 100*b* (step S82). The CPU 131 of the wireless communication device 100*b* receives the advertising packet that includes the connection information.

Figure 8:
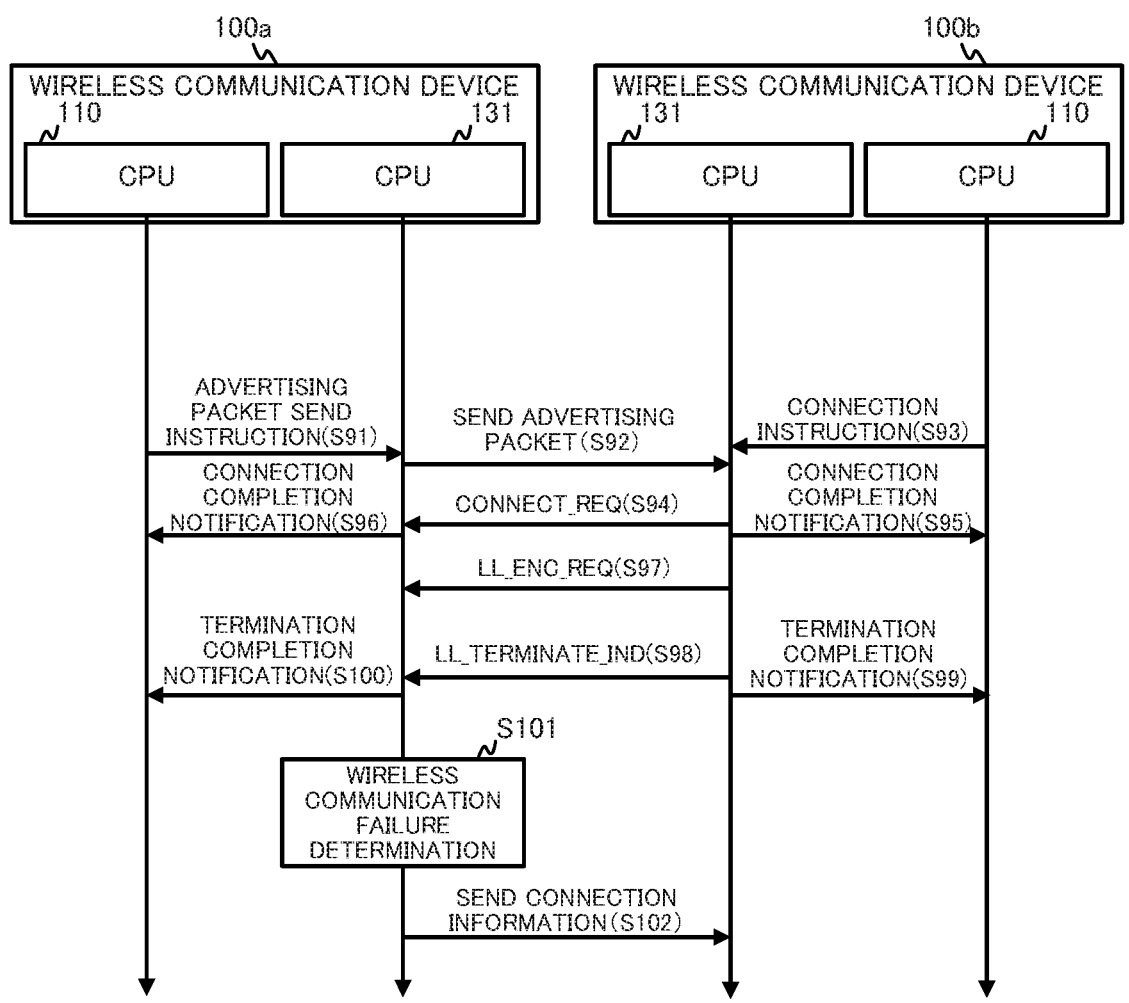
FIG. 8 is a sequence diagram illustrating the operations of the wireless communication system when the wireless communication devices fail to wirelessly communicate after reconnection.

FIG. 8 is a sequence diagram illustrating an example of the reconnection operations of the wireless communication system 1 according to the present embodiment. As illustrated in FIG. 4, FIG. 8 illustrates an example of a case in which the connection between the wireless communication devices 100*a* and 100*b* is terminated and, thereafter, the wireless communication devices 100*a* and 100*b* do not satisfy Condition 3 described above and wireless communication after reconnection fails.

The CPU 110 of the wireless communication device 100*a* instructs the CPU 131 of the communication module 103 to send the advertising packet (step S91). Thereafter, as in step S12 illustrated in FIG. 4, the CPU 131 sends the advertising packet each time interval (step S92).

The CPU 110 of the wireless communication device 100*b* instructs the CPU 131 of the communication module 103 to send a connection request to the wireless communication device 100*a* upon reception of the advertising packet from the wireless communication device 100*a* (step S93). Then, when the advertising packet is received from the wireless communication device 100*a*, the CPU 131 sends a connection request (CONNECT_REQ) to the wireless communication device 100*a* (step S94). Additionally, the CPU 131 sends a connection completion notification to the CPU 110 (step S95).

When the connection request (CONNECT_REQ) is received, the CPU 131 of the wireless communication device 100*a* sends a connection completion notification to the CPU 110 (step S96). Thus, the wireless communication devices 100*a* and 100*b* are reconnected.

Then, since the wireless communication device 100*b* has the encryption information of the wireless communication device 100*a* that was stored in step S26 in FIG. 4, after reconnection with the wireless communication device 100*a*, the CPU 131 of the wireless communication device 100*b* sends an encryption request (LL_ENC_REQ) requesting encrypted communication (step S97).

Meanwhile, the CPU 131 of the wireless communication device 100*a* is not paired with the wireless communication device 100*b* and is waiting for an encryption information request (SMP_Pairing_RES) and, as such, does not send the encryption response (LL_ENC_RES), which is expected by the wireless communication device 100*b*. As such, due to the encryption response (LL_ENC_RES) not being received within the predetermined period of time, the CPU 131 of the wireless communication device 100*b* sends an indicator (LL_TERMINATE_IND) to terminate the connection with the wireless communication device 100*a* to the wireless communication device 100*a* (step S98), and sends a termination completion notification to the CPU 110 (step S99). When the connection termination indicator (LL_TERMINATE_IND) is received, the CPU 131 of the wireless communication device 100*a* sends a termination completion notification to the CPU 110 (step S100).

Then, the CPU 131 of the wireless communication device 100*a* determines that the wireless communication after reconnection with the wireless communication device 100*b* has failed (step S101). Then, the CPU 131 sends, for a certain period of time, an advertising packet including the connection information related to the connection with the wireless communication device 100*b* (step S102). The CPU 131 of the wireless communication device 100*b* receives the advertising packet including the connection information.

As described above, when reconnection or wireless communication after reconnection with the other wireless communication device 100, which was connected to in the past, fails, the wireless communication device 100 according to the present embodiment broadcasts the connection information related to that connection. As a result, the other wireless communication device 100 will receive the connection information that was broadcast and, thereby, can acquire the connection information.

In the present embodiment, after connecting to the other wireless communication device 100, the wireless communication device 100 exchanges, with the other wireless communication device 100, the device information that identifies the wireless communication device and the encryption information for encryption of the wireless communication with the other wireless communication device 100. Then, after terminating the connection with the other wireless communication device 100, the wireless communication device 100 determines whether reconnection or wireless communication after reconnection with the other wireless communication device 100 was successful on the basis of the device information and the encryption information that was exchanged. Thus, connection information of cases can be acquired in which reconnection or wireless communication after reconnection fails in encrypted communication with the other wireless communication device 100.

In the present embodiment, the wireless communication device 100 sends an advertising packet announcing its presence after the connection with the other wireless communication device 100 has been terminated. Then, when the wireless communication device 100 does not receive a connection request from the other wireless communication device 100 in response to the advertising packet, the wireless communication device 100 determines that reconnection with the other wireless communication device 100 has failed. Thus, connection information of cases in which reconnection with the other wireless communication device 100 has failed can be acquired.

In the present embodiment, the wireless communication device 100 determines that wireless communication after reconnection with the other wireless communication device 100 has failed in cases in which, after connection termination and subsequent reconnection with the other wireless communication device 100, an encryption information request requesting the exchange of encryption information is received from the other wireless communication device 100. Thus, connection information of cases can be acquired in which wireless communication after reconnection with the other wireless communication device 100 has failed.

In the present embodiment, the wireless communication device 100 determines that wireless communication after reconnection with the other wireless communication device 100 has failed in cases in which, after connection termination and subsequent reconnection with the other wireless communication device 100, an encryption request requesting the encryption of wireless communication with the other wireless communication device 100 is received and the wireless communication device 100 does not have the encryption information of the other wireless communication device 100. Thus, connection information of cases can be acquired in which wireless communication after reconnection with the other wireless communication device 100 has failed.

Note that, the present disclosure is not limited to the embodiments described above and various modifications are possible.

For example, in the embodiments described above, an example was described in which the wireless communication device 100*b* operating as the central receives the connection information broadcast by the wireless communication device 100*a*. However, the device that receives the broadcast connection information is not limited to the wireless communication device 100*b* operating as the central. Alternatively, the wireless communication device 100*b* may upload the connection information received from the wireless communication device 100*a* to the cloud, for example, and provide the connection information to the vendor of the wireless communication device 100*a*.

In the embodiments described above, an example is described in which the wireless communication devices 100 communicate via Bluetooth (registered trademark). However, the wireless communication devices 100 may communicate via a different communication method such as, for example, via a wireless local area network (LAN) or Wi-Fi (registered trademark).

In the embodiments described above, an example is described in which the CPU 110 and the CPU 131 carry out control operations. However, the control operations are not limited to software control by the CPU 110 and the CPU 131. Part or all of the control operations may be realized using hardware components such as dedicated logic circuits.

Additionally, in the foregoing description, an example was described in which the ROM 102, made from nonvolatile memory such as flash memory, was used as the computer-readable medium on which the program 113 related to the wireless control processing of a preferable embodiment was stored. However, the computer-readable medium is not limited thereto, and portable recording media such as hard disk drives (HDD), compact disc read-only memory (CD-ROM), and digital versatile discs (DVD) may be used. Additionally, a carrier wave may be used as the medium to provide, over a communication line, the data of the program according to a preferred embodiment.

In addition, the specific details such as the configurations, the control procedures, and the display examples described in the embodiments may be appropriately modified without departing from the scope of the invention.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A wireless communication device comprising:
   a wireless communicator configured to wirelessly communicate with another wireless communication device; and
   a processor configured to:
   after establishing a connection with the other wireless communication device, control the wireless communicator to send to the other wireless communication device, device information that identifies the wireless communication device and encryption information of the wireless communication device for encryption of wireless communication with the other wireless communication device;
   after termination of the connection with the other wireless communication device, communication device failed; complete reconnection with the other wireless communication device; and
   after completion of the reconnection with the other wireless communication device:
   control the wireless communicator to receive, from the other wireless communication device, an encryption request that requests encrypted communication,
   wherein the encryption request is sent by the other wireless communication device based on the device information that identifies the wireless communication device and the encryption information of the wireless communication device held by the other wireless communication device;
   in response to receiving the encryption request, determine that wireless communication after reconnection with the other wireless communication device has failed; and
   in response to determining that the wireless communication after reconnection with the other wireless communication device has failed in response to receiving the encryption request, control the wireless communicator to send connection information including data expressing that the encryption request from the other wireless communication device has been received as a cause of the wireless communication after reconnection with the other wireless communication device having failed.

2. The wireless communication device according to claim 1,
wherein the processor is configured to:
after completion of the reconnection with the other wireless communication device:
control the wireless communication to receive, from the other wireless communication device, an encryption information request to send the encryption information of the wireless communication device for encryption of wireless communication with the other wireless communication device;
in response to receiving the encryption information request, determine that wireless communication after reconnection with the other wireless communication device has failed; and
in response to determining that the wireless communication after reconnection with the other wireless communication device has failed in response to receiving the encryption information request, control the wireless communicator to send connection information including data expressing that the other wireless communication device has lost the encryption information of the wireless communication device sent after establishing the connection to the other wireless communication device as the cause of the wireless communication after reconnection with the other wireless communication device having failed.

3. The wireless communication device according to claim 1,
wherein the processor is configured to, after termination of the connection with the other wireless communication device and completion of the reconnection with the other wireless communication device:
determine that the processor does not have the encryption information of the other wireless communication device; and
in response to receiving the encryption request and determining that the processor does not have the encryption information of the other wireless communication device, determine that the wireless communication after reconnection with the other wireless communication device has failed.

4. The wireless communication device according to claim 1,
wherein the processor is configured to:
after termination of the connection with the other wireless communication device:
control the wireless communicator to send presence information indicating that the wireless communication device is present;
after controlling the wireless communicator to send the presence information, determine that a connection request has not been received in a predetermined period of time from the other wireless communication device; and
in response to determining that the connection request has not been received in the predetermined period of time from the other wireless communication device, control the wireless communicator to send connection information including data expressing that the other wireless communication device has lost the device information that identifies the wireless communication device and the encryption information of the wireless communication device as a cause of reconnection between the wireless communication device and the other wireless communication device having failed.

5. An electronic timepiece comprising:
the wireless communication device according to claim 1;
a timer configured to clock a current time; and
a display configured to be controlled to display the current time clocked by the timer.

6. A wireless communication device comprising:
a wireless communicator configured to wirelessly communicate with another wireless communication device; and
a processor configured to:
after establishing a connection with the other wireless communication device, control the wireless communicator to receive, from the other wireless communication device, device information that identifies the other wireless communication device and encryption information of the other wireless communication device for encryption of wireless communication with the other wireless communication device;
after termination of the connection with the other wireless communication device, complete reconnection with the other wireless communication device; and
after completion of the reconnection with the other wireless communication device:
control the wireless communicator to send, to the other wireless communication device, an encryption request that requests encrypted communication,
wherein the encryption request is sent based on the device information that identifies the other wireless communication device and the encryption information of the other wireless communication device received from the other wireless communication device after establishing the connection with the other wireless communication device; and
control the wireless communicator to receive, from the other wireless communication device, connection information including data expressing that the encryption request has been received as a cause of wireless communication after reconnection with the other wireless communication device having failed.

7. A wireless communication method executed by a wireless communication device comprising a wireless communicator that wirelessly communicates with another wireless communication device, the wireless communication method comprising:
after establishing a connection with the other wireless communication device, controlling the wireless communicator to send to the other wireless communication device, device information that identifies the wireless communication device and encryption information of the wireless communication device for encryption of wireless communication with the other wireless communication device;
after termination of the connection with the other wireless communication device, completing reconnection with the other wireless communication device; and after completion of the reconnection with the other wireless communication device:
controlling the wireless communicator to receive, from the other wireless communication device, an encryption request that requests encrypted communication, wherein the encryption request is sent by the other wireless communication device based on the device information that identifies the wireless communication device and the encryption information of the wireless communication device held by the other wireless communication device;
in response to receiving the encryption request, determining that wireless communication after reconnection with the other wireless communication device has failed; and
in response to determining that the wireless communication after reconnection with the other wireless communication device has failed in response to receiving the encryption request, controlling the wireless communicator to send connection information including data expressing that the encryption request from the other wireless communication device has been received as a cause of the wireless communication after reconnection with the other wireless communication device having failed.

8. A wireless communication method executed by a wireless communication device comprising a wireless communicator that wirelessly communicates with another wireless communication device, the wireless communication method comprising:
after establishing a connection with the other wireless communication device, controlling the wireless communicator to receive, from the other wireless communication device, device information that identifies the other wireless communication device and encryption information of the other wireless communication device for encryption of wireless communication with the other wireless communication device;
after termination of the connection with the other wireless communication device, completing reconnection with the other wireless communication device; and
after completion of the reconnection with the other wireless communication device:
controlling the wireless communicator to send, to the other wireless communication device, an encryption request that requests encrypted communication,
wherein the encryption request is sent based on the device information that identifies the other wireless communication device and the encryption information of the other wireless communication device received from the other wireless communication device after establishing the connection with the other wireless communication device; and
controlling the wireless communicator to receive, from the other wireless communication device, connection information including data expressing that the encryption request has been received as a cause of wireless communication after reconnection with the other wireless communication device having failed.

9. A non-transitory computer-readable recording medium storing a program, for controlling a wireless communication device comprising a wireless communicator that wirelessly communicates with another wireless communication device, and a computer, wherein the program causes the computer to at least perform:

after establishing a connection with the other wireless communication device, controlling the wireless communicator to send to the other wireless communication device, device information that identifies the wireless communication device and encryption information of the wireless communication device for encryption of wireless communication with the other wireless communication device;
after termination of the connection with the other wireless communication device, completing reconnection with the other wireless communication device; and
after completion of the reconnection with the other wireless communication device:
controlling the wireless communicator to receive, from the other wireless communication device, an encryption request that requests encrypted communication, wherein the encryption request is sent by the other wireless communication device based on the device information that identifies the wireless communication device and the encryption information of the wireless communication device held by the other wireless communication device;
in response to receiving the encryption request, determining that wireless communication after reconnection with the other wireless communication device has failed; and
in response to determining that the wireless communication after reconnection with the wireless communication device has failed in response to receiving the encryption request, controlling the wireless communicator to send connection information including data expressing that the encryption request from the other wireless communication device has been received as a cause of the wireless communication after reconnection with the other wireless communication device having failed.

10. A non-transitory computer-readable recording medium storing a program for controlling a wireless communication device comprising a wireless communicator that wirelessly communicates with another wireless communication device, and a computer, wherein the program causes the computer to at least perform:
after establishing a connection with the other wireless communication device, controlling the wireless communicator to receive, from the other wireless communication device, device information that identifies the other wireless communication device and encryption information of the other wireless communication device for encryption of wireless communication with the other wireless communication device;
after termination of the connection with the other wireless communication device, completing reconnection with the other wireless communication device; and
after completion of the reconnection with the other wireless communication device:
controlling the wireless communicator to send, to the other wireless communication device, an encryption request that requests encrypted communication,
wherein the encryption request is sent based on the device information that identifies the other wireless communication device and the encryption information of the other wireless communication device received from the other wireless communication device after establishing the connection with the other wireless communication device; and controlling the wireless communicator to receive, from the other wireless communication device, connection information including data expressing that the encryption request has been received as a cause of wireless communication after reconnection with the other wireless communication device having failed.

\* \* \* \* \*

UNITED STATES PATENT AND TRADEMARK OFFICE
CERTIFICATE OF CORRECTION

PATENT NO. : 10,863,568 B2  
APPLICATION NO. : 16/139280  
DATED : December 8, 2020  
INVENTOR(S) : Hiroshi Iwamiya Page 1 of 1

It is certified that error appears in the above-identified patent and that said Letters Patent is hereby corrected as shown below:

In the Claims

Column 14, Claim 1, Lines 45 and 46 should read:
wireless communication device, complete reconnection with the other Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*